Dec. 19, 1950 F. W. ROBERTS ET AL 2,534,735

GUARDED STYLUS

Filed Jan. 19, 1945

INVENTORS
Frederick W. Roberts
Simon Yerkovich
BY
Blair, Curtis & Hayward
ATTORNEYS Patented Dec. 19, 1950 2,534,735

UNITED STATES PATENT OFFICE 2,534,735

GUARDED STYLUS

Frederick W. Roberts and Simon Yerkovich, Fairfield, Conn., assignors to Dictaphone Corporation, New York, N. Y., a corporation of New York Application January 19, 1945, Serial No. 573,580

2 Claims. (Cl. 274—38)

This invention relates to constructions of styli such as are frequently used in sound recording and reproducing equipment. More particularly it pertains to a construction which includes a guard as a part of the stylus for preventing the stylus from piercing a recording medium and to protect the stylus generally.

Various constructions have been suggested in the past for altering the action of a stylus or for reinforcing a weakness inherent in its formation. These are not to be confused with a stylus embodying our invention. Among these were the well-known leader-ball arrangements. In others various types of partial covers and collars have been used. In one type of construction the stylus itself is carried upon a flexible spring-like arm and is protected by a bumper such that if the translating head is dropped, the stylus itself may flex upwardly with respect to the bumper thereby allowing the bumper to receive most of the impact of the fall. In other constructions the stylus has been complicated by an enveloping sheath extending through more or less of its length for the purpose of holding a damping medium in contact with the stylus shank so as to absorb certain unwanted vibrations of given frequencies. In another form the stylus shank has been slightly flexible, and it has been surrounded with an inflexible sleeve co-axial therewith but spaced therefrom in order that the sleeve may limit bending movements of the stylus. Thus the stylus cannot be given a permanent set nor bent beyond its elastic limit. In still other types of styli the tip of the stylus has consisted of a very hard alloy welded to a shank of some softer metal, the butt weld between the two metals being protected by a tightly fitting sleeve which overlaps and supports the welded butt joint. For other constructions it has been suggested to embed a jewel in the end of a metallic shank and then reinforce the bond between the jewel and shank either by a collar pressed into a position overlapping both the jewel and the shank or by plating a material such as nickel onto the shank and around the edge of the jewel.

These previous stylus constructions have in some instances served useful purposes. And they are interesting insofar as the history of the stylus art is concerned. But our invention relates to problems which these devices did not attempt to solve, and it should not be confused with these devices.

It has long been recognized that hard jewels, such as corundum or diamond, having hardnesses on the order of nine or ten Mohs' scale, have superior qualities for use as stylus tips. And accordingly, a number of the styli used today have a polished jewel tip embedded in a shank of aluminum or other suitable material. These styli tips are cylindrical blanks of a diameter on the order of .035 to .050 in. The end of the tip is polished to give a smooth, curved point having a radius on the order of .001 to .002 in.

Such styli have found use, among other places, in recording apparatus such as is disclosed and claimed in Yerkovich Patent No. 2,318,828, issued May 11, 1943, where recording is done on the surface of a plastic belt with a swedging action which furrows the sound vibrations into the surface of the recording medium. And we shall describe our invention in its relation to styli for such apparatus.

Sometimes the plastic recording belts and films as disclosed in the Yerkovich patent are only a few thousandths of an inch in thickness. The tip of the stylus is necessarily quite fragile because of the minute volume of material which is present at the point and because of the further fact that most of the tip materials which are sufficiently hard to have the desired wearing qualities are also relatively brittle. The result has been that full advantage has not been realized from the harder stylus tips because they have been chipped or completely broken off before they have been worn sufficiently to necessitate replacement. Sometimes it happens that a stylus point will pierce a recording medium and come into contact with a metal plate or recording anvil below. Contact between the stylus tip and the support for the recording medium almost always results in chipping the point of the stylus. Our invention has general utility in protecting a stylus tip and particular utility in preventing contact between the point of a stylus and the support for the recording medium.

It is accordingly an object of our invention to provide a stylus of the character described having to a notable extent the characteristics and capabilities above set forth. Another object is to provide a practicable stylus which can be manufactured commercially and which overcomes the above-mentioned as well as other well-known difficulties which have attended the use of the styli of the prior art. Other objects will be in part pointed out as the description proceeds and will in part become apparent therefrom.

The invention accordingly consists in the features of construction, combinations of elements, and arrangements of parts as will be exemplified in the structure to be hereinafter described and the scope of the application of which will be set forth in the accompanying claims.

Figures 1, 2, 3:
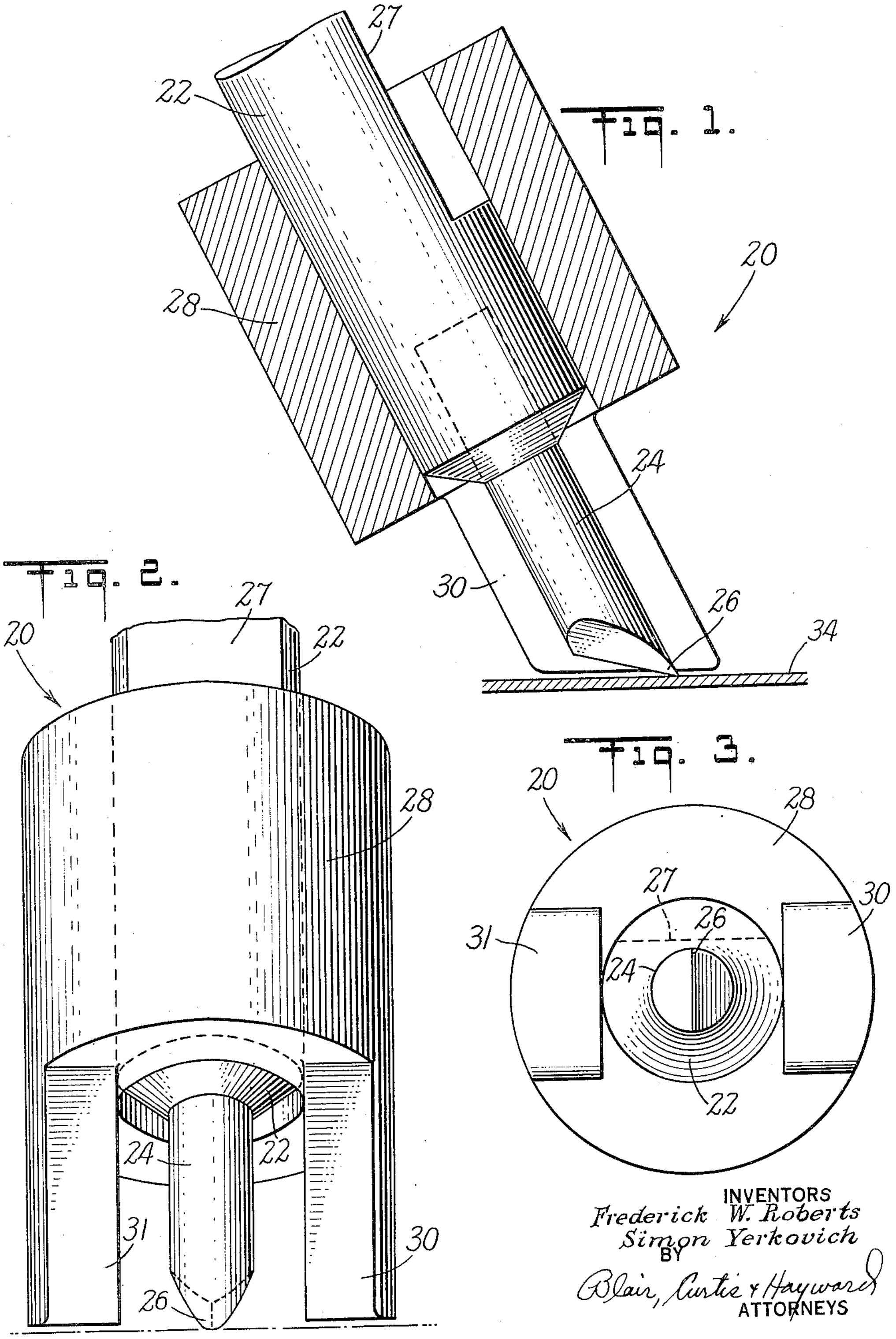
Figure 1 is an elevational view partly in section of a stylus embodying the invention drawn on a scale of approximately 20 to 1 and showing the relationship between stylus and recording medium, the tip of the stylus resting upon, but not being impressed into, the surface of the recording medium.
Figure 2 is an elevational view of the stylus taken from the right as viewed in Figure 1.
Figure 3 is an end view of the stylus looking toward the point.

The stylus is indicated generally in Figure 1 by numeral 20. It consists of a shank 22, made of aluminum in the present embodiment, which carries a jewel tip 24 of polished sapphire. The tip is cylindrical in shape and has a diameter on the order of .040 in. The point 26 of the stylus has been ground in a conventional manner not a part of our invention but the relatively fragile properties of this point are apparent from an inspection of the drawings. This point is typical of those which our invention can protect. Shank 22 is provided with a flat side 27 as is customary so that the point of the stylus may be properly oriented with respect to the translating head.

A stylus guard 28 is shown pressed upon shank 22 including sled runner-like feet 30 and 31 spaced apart and straddling jewel 24. The general relationship between tip 24, foot 30 and the recording medium are illustrated in Figure 1, where the recording medium is indicated by numeral 34. The corners and edges of the feet are smoothly rounded and the bottom surfaces of the feet, when in recording position, are substantially parallel to the upper surface of the recording medium. And the spacing between the bottom surfaces of the feet and the recording medium is less than the thickness of the record material; this means that the spacing is on the order of a few thousandths of an inch.

In Figure 1 the movement of recording medium 34 with respect to the stylus is to the right. In the past it has been found that occasionally an inexperienced operator will manually move the recording medium to the left, as viewed in Figure 1. Such movement tends to cause an ordinary stylus to dig into the record material, and if the movement is sufficiently great the stylus will pierce the record and come into contact with a recording anvil provided therebelow. This nearly always chips the stylus point. And sometimes a translating head will be dropped, or pushed downwardly, onto the recording medium, in spite of precautionary devices and instructions to the contrary. With our guarded stylus, however, it becomes impossible for point 26 completely to pierce the recording medium. In the commercial form in which it has already been used, the axis of the guarded stylus forms an angle of 27 degrees with a perpendicular to the surface of the recording medium. The thickness of the recording medium is about .005 in. and the clearance between the surface of the recording medium and the foot of the stylus guard when the tip of the stylus is in point contact with, but not impressed into, the recording medium is on the order of .0025 to .0035 in. This is sufficient to permit normal recording and tracking without interference from the feet of the guard.

In assembling the guard on the stylus shank, the shank is turned down to a predetermined size and the guard is then pressed onto the shank in a special fixture in a shadowgraph where the dimensions can be accurately controlled. The guard itself is separated from the stylus tip at all points and therefore cannot injure the jewel during assembly nor transmit shocks directly to the jewel. Furthermore, the spacing of the two feet insures a self-cleaning action such that particles of dust do not gather unduly between the guard feet and the stylus tip.

From the foregoing it will be seen that a stylus made in accordance with the present invention is well adapted to attain the ends and objects hereinbefore set forth, and to be economically manufactured, since the entire assembly is suited to common production methods and is susceptible of a wide latitude of variations as may be desirable in adapting the invention to different applications.

As various embodiments may be made of the above invention and as changes might be made in the embodiment above set forth, it is to be understood that all matter hereinbefore set forth or shown in the accompanying drawings is to be interpreted as illustrative and not in a limiting sense.

We claim:

1. A stylus of the character described including a stylus shank, a stylus tip having a point and tip portions adapted to lie within a sound groove, and a stylus tip guard comprising a collar carried by said shank and including a pair of feet extending parallel to the axis of the stylus and spaced on each side of, but out of contact with, the stylus tip; said feet defining terminal surface portions, said tip portions and said terminal surface portions being fixed relative to each other, the point on said stylus locating a plane parallel to a plane passing through said terminal surface portions, and the distance between said planes being not greater than a few thousandths of an inch but not as small as the altitude of said tip portions.

2. A stylus including: a stylus shank, a stylus tip having a point and tip portions adapted to lie within a sound groove, and a stylus tip guard comprising a collar carried by said shank and including a foot extending parallel to the axis of the stylus and spaced beside but out of contact with the stylus tip; said stylus being of a type adapted to a predetermined orientation with respect to a translating head in which it operates whereby one face of the stylus tip will define an approach surface with respect to the recording medium and the opposite face of the stylus tip will define a trailing surface with respect to the recording medium, the foot of said tip guard being oriented to one side of the stylus tip where it is not directly in front of the approach surface nor directly behind the trailing surface of the stylus tip, said foot defining a terminal surface portion, said tip portions and said terminal surface portion being fixed relative to each other, the point on said stylus locating a plane parallel to a plane passing through said terminal surface portion transversely with respect to the stylus axis, and the distance between said planes being not greater than a few thousandths of an inch.

FREDERICK W. ROBERTS.
SIMON YERKOVICH.

REFERENCES CITED

The following references are of record in the file of this patent:

UNITED STATES PATENTS

| Number | Name | Date |
|---|---|---|
| 1,391,425 | Steinert | Sept. 20, 1921 |
| 1,879,722 | Walton | Sept. 27, 1932 |
| 2,249,713 | Imelmann | July 15, 1941 |
| 2,276,562 | Capps | Mar. 17, 1942 |
| 2,280,763 | Hasbrouck | Apr. 21, 1942 |
| 2,320,416 | Dally | June 1, 1943 |
| 2,325,343 | Semple | July 27, 1943 |

FOREIGN PATENTS

| Number | Country | Date |
|---|---|---|
| 371,227 | Great Britain | Apr. 21, 1932 |